United States Patent [19]

Perrault et al.

[11] 4,116,734

[45] Sep. 26, 1978

[54] COMPOSITE EXPLOSIVES

[75] Inventors: Guy Perrault, Ste-Foy; Raynald Francoeur, Nord; Roger Lavertu, Ste-Foy, all of Canada

[73] Assignee: Her Majesty the Queen in right of Canada, as represented by the Minister of National Defence

[21] Appl. No.: 840,367

[22] Filed: Oct. 7, 1977

[30] Foreign Application Priority Data

Oct. 28, 1976 [CA] Canada .................................. 264354

[51] Int. Cl.$^2$ ............................................. C06B 45/10
[52] U.S. Cl. .................................. 149/19.2; 149/19.4; 149/19.9
[58] Field of Search ...................... 149/19.2, 19.4, 19.9

[56] References Cited

U.S. PATENT DOCUMENTS

| 3,260,631 | 7/1966 | Witz et al. | 149/19.4 |
| 3,266,959 | 8/1966 | Ackley | 149/19.4 |
| 3,403,061 | 9/1968 | McDonald | 149/7 |
| 3,666,575 | 5/1972 | Fisher | 149/19.2 |
| 3,715,246 | 2/1973 | Sayles | 149/19.2 |
| 3,839,106 | 10/1974 | De Prisque et al. | 149/19.9 |
| 3,853,646 | 12/1974 | Frankel et al. | 149/19.9 |
| 3,888,707 | 6/1975 | Rothenstein | 149/19.9 |
| 3,984,264 | 10/1976 | Lampert | 149/11 |

Primary Examiner—Edward A. Miller
Attorney, Agent, or Firm—Cushman, Darby & Cushman

[57] ABSTRACT

The disclosed invention is a gravity pourable explosive composition comprising a solid explosive ingredient, a polybutadiene based binder cured with a diisocyanate, and an organofunctional silane. The explosive composition according to the invention exhibits improved physical properties e.g. viscosity and gel time, which facilitates product, particularly at low temperatures; and improved mechanical properties eg. elongation and strain.

9 Claims, No Drawings

COMPOSITE EXPLOSIVES

This invention relates to composite explosives of improved physical and mechanical properties.

Traditionally used trinitrotoluene (TNT) based explosives suffer from the following drawbacks.

(1) the significant reduction in volume during solidification of the TNT,
(2) great brittleness,
(3) a relatively low fusion point (80° C.),
(4) exudation,
(5) the difficulty or impossibility of filling irregular-shaped charges.

In attempts to solve these problems, hexowaxes and plastic-bonded explosives (PBX) have been used as the binder to replace TNT. In these compositions, the crystals of the explosive ingredient are first phlegmatized by means of wax or various plastics e.g. nylon, and then pressed in shells or moulds.

Hexowaxes and plastic-bonded explosives are expensive because it is usually necessary to employ them under compression. This process requires specialized and complex technology, especially so for armament pieces of special shapes and sizes. In addition, they are often sensitive and their operating temperature is limited by the softening temperature of the wax or resin, temperatures which, if too high, will entail production difficulties.

Another solution is to apply the principle of elastometric binders and the technology of solid propellants to composite explosives.

These composite explosives generally comprise mixtures of energetic solids e.g. cyclotrimethylenetrinitramine (RDX), cyclotetramethylenetetranitramine (HMX), ammonium perchlorate (NH$_4$ClO$_4$) and aluminum, retained in an elastomeric, heat hardened matrix e.g. polyurethane, polyester and polyamide.

The production of these composite explosives is generally realized by pouring into the munition under vacuum, followed by a period of curing which gives the product its final properties.

Although their mechanical properties are better than those platics-binder and conventional TNT based explosives, they have generally inferior physical properties. For example, their viscosity is very high (greater than 1 kP) and their gel time is low.

The high viscosity makes them difficult to pour, especially into small diameter munitions. Another problem associated with high viscosity explosives is that only a limited amount of the explosive solid may be included in the composite, otherwise the viscosity becomes too high. On the other hand, if the viscosity of the composite was lower, a larger amount of the explosive ingredient could be included, thus increasing the power of the explosive in a given volume. The low gel time is a drawback, particularly when filling a large number of munitions from a batch of composite explosive. The low gel time means that the munitions must be quickly filled before gelling occurs. This is especially true when filling small diameter munitions where a longer time is required to complete the filling operation.

The main drawbacks of these explosives are the need to improve certain physical properties e.g. viscosity and gel time which facilitate production, particularly, at low temperatures, and to provide greater variability in respect of their mechanical properties e.g. elongation and strain.

It is thus an object of the present invention to solve these various problems by the improvement of composite explosives by employing elastomeric matrix binders of the type used in solid propellants e.g. a polybutadiene based binder cured with a diisocyanate, and by the addition of a suitable organic surface active agent.

The composite explosives according to the invention preferably include a solid explosive ingredient e.g. RDX, HMX and HNS (hexanitrostilbene), a polybutadiene based binder cured with a diisocyanate, a plasticizer e.g. diethylhexylazelate, isodecyl pelargonate, dioctyladipate, and other diesters of low molecular weight and low volatility, and a catalyst e.g. ironacetylacetonate.

The amount of explosvie solid in the composite may range from 70–85%/w, the remainder comprising the binder, curing agent, plasticizer and catalyst.

The NCO/OH ratio is preferably kept between about 0.85 and 1.3. The most preferred ratio being about 1.15.

As binders, hydroxyl terminated polybutadienes are preferred e.g. those known by the trade marks Polybd R45M and R45HT, both manufactured by ARCO CHEMICAL CORPORATION.

These compounds are represented by the structural formula:

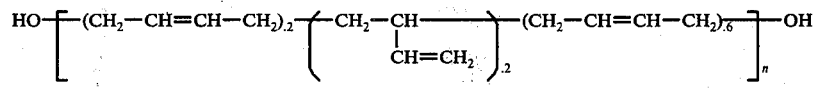

wherein $n = 44$–$65$ and the polybutadiene structure is 60% trans-1,4, 20% cis-1,4, and 20% vinyl-1,2.

The preferred diisocyanate curing agents are toluenediisocyanate (TDI), DDI Diisocyanate (a trademark for an intermediate made from a 36-carbon dimer aliphatic dibasic acid) and isophoronediisocyanate (IPDI).

As surface active agents, natural product emulsifiers e.g. lecithin, asolectine (a trade name for a highly purified phospholipid product comprising lecithin, cephalin, inositol phosphatides and soybean oil, manufactured by American Lecithin Company) etc. can be used to improve the physical properties of the composite i.e. lower the viscosity of the mixture and increase the gel time, thus facilitating production of the composite. However, it is generally considered that these products would have an adverse effect on the mechanical properties of the composite. It will be apparent from the following that this is not the case.

As in several known composite explosives, the interface between the energetic solid and the elastometric matrix limits the range of feasible properties, especially at low temperature. It thus becomes necessary to use additional other compatible surface active agents to improve the mechanical properties of the finished product and adapt these properties to various applications.

It has been found that the commercially available organofunctionalsilane family of products promote adhesion between a solid and a binder. Several mechanisms seen to indicate that these silanes could be effective in the presence of energetic solids. More specifically, several of the energetic solids discussed above, RDX and HMX among others, are stored in an ethanol and water carrier solution, in which some molecules can be retained in the solid crystals during displacement by the plasticizer, or during evaporation in a vacuum, or during any other process that renders the solid usable in composite explosives. It is believed that the alkoxy-functional or halogen-substituted silane derivatives react with the hydroxyl functions to form a chemical bond at the surface of the solid and to provide a lateral chain that is soluble in the organic binder. Secondly, the same reactivity of silane on the OH functions, by eliminating them from the solid, can activate the surface and increase the Van der Waals attraction at the interface. Moreover, the silane derivatives can react with the hydroxyl functions of the prepolymer to produce solid-silane-prepolymer chemical bonds, or other combinations with the curing agent. Finally, it can be assumed that the silane derivatives react with traces of humidity in the binder, prepolymer, plasticizer and curing agent ingredients to produce the hydroxyl functions that allow the formation of hydrogen bonding at the surface of the solid.

It is therefore proposed that the use of natural product emulsifier e.g. lecithin and asolectin reduces the viscosity and increases the gel time of the composite i.e. thus facilitating production thereof.

It is also proposed that the use of silane derivatives through the action of the polymer-solid interface would improve the mechanical properties of composite explosives.

It is further proposed that the simultaneous use of natural product emulsifiers such as lecithin and asolectin, and silane derivatives, would permit a reduction in viscosity and increased gel time to facilitate production and at the same time provide improved mechanical properties.

The advantage of the preferred embodiment of the invention will be apparent from the following examples.

EXAMPLE 1

In a 0.5 lb capacity Sigma mixer we mix 80% RDX, 5% plasticizer, diethylhexylazelate (DEHA), 0.0016% catalyst, iron acetylacetonate (FeAA), 0.075% asolectin and 14.92% of sufficient hydroxyl terminated polybutadiene (R-45M) and toluene diisocyanate, to obtain the ratio NCO/OH = 1.15. The resulting mixture is poured under vacuum into a suitable container and placed in a drying oven to be heated at 60° C. until it reaches constant hardness (4–7 days).

The properties of this product are indicated in Table 1, B. The viscosity is two to three times less than that of composite A, and the gel time is increased 30% thus increasing the margin of safety when pouring. The mechanical properties are almost identical to those of composite A but the 12% increase tan $\delta$ indicates an undersirable weakening of the solid-polymer interface.

EXAMPLE 2

By following the same procedure exactly as in the previous example, except that the asolectin is replaced by 0.173% silane A-174 (trade designation for gamma-methacryloxpropyltrimethoxy silane obtainable from Union Carbide, a product is obtained whose properties are summarized in the table 1, C. Compared to the composite with no additives (table 1, A), the silane changes the viscosity of the mixture only slightly, but the gel time and the elongation property ($\epsilon m$) are improved. The improvement in elongation ($\epsilon m$) is seen especially at 220° K. where strain ($\sigma m$) approaches that of product A while $\epsilon m$ is increased significantly.

EXAMPLE 3

This composite contains 0.075% asolectin and 0.173% silane A-174 and its properties are summarized in table 1, D. Viscosity is lowered, gel time is increased and the mechanical properties are improved simultaneously. It will also be noted that tan $\delta$ produces the lowest value of all the products, an indication of better cohesion at the interface.

EXAMPLE 4–8:

Various products were prepared using the same procedure as in Example 3, but varying the ratio of NCO/OH to provide information on the effect of silane on the stoichiometric balance after curing and on the range of feasible properties. The results are found in Table 2. Mechanical properties appear to reach a plateau at a ratio of 1.15. Particularly, it will be noted that the lowest values for tan $\delta$ max are achieved at NCO/OH ratios of 1.15 and 1.3. This indicates good adhesion at the interface.

TABLE 1

Properties of composite explosives

| Surface Active Agent | Viscosity Kp | Gel time min | Elongation $\epsilon_m\%$ 333°, | 255°, | 220°(K) | Strain $\sigma_m$(psi) 333°, | 255°, | 220°(K) | tan $\delta$ max |
|---|---|---|---|---|---|---|---|---|---|
| A) — | 1.3 | 140 | 6, | 10, | 10 | 42, | 100, | 212 | 0.72 |
| B) azolectine(.075) | 0.5 | 180 | 5, | 9, | 9 | 45, | 101, | 216 | 0.82 |
| C) silane A-174(.173%) | 1.1 | 180 | 11, | 19, | 14 | 30, | 67, | 192 | 0.78 |
| D) silane + azolectine | 0.5 | 165 | 8, | 15, | 15 | 35, | 79, | 219 | 0.70 |

TABLE 2

Effect of NCO/OH ratio on the properties of composite explosives containing 0.173% of silane A-174

| NCO/OH | Viscosity Kn | Gel time min | Elongation $\epsilon_m\%$ 333°, | 255°, | 220°(K) | Strain $\sigma_m$(Psi) 333°, | 255°, | 220°(K) | tan $\delta$ max |
|---|---|---|---|---|---|---|---|---|---|
| 0.85 | 1.44 | 185 | 48, | 59, | 30 | 15, | 36, | 137 | 0.70 |
| 1.0 | 1.25 | 185 | 20, | 30, | 19 | 25, | 56, | 176 | 0.69 |
| 1.15 | 1.17 | 165 | 13, | 23, | 15 | 30, | 68, | 200 | 0.66 |
| 1.3 | 1.03 | 145 | 10, | 19, | 13 | 28, | 72, | 202 | 0.66 |

The following other silanes were studies in this work; silane A-186 (beta-3-4-(epoxycyclohexyl) ethyltrimethoxysilane), silane A-187 (gammaglycidoxypropyltrimethoxysilane), dimethylchlorosilane, trimethyl chlorosilane and N,O-bis-(trimethylsilyl)-acetamide. Silanes A-186 and A-187 are trade designations for these products obtainable from Union Carbide.

The tan δ max was measured for compositions identical to C of table 1, wherein the silane A-174 was replaced by silane A-186 and by silane A-187. The same value resulted in each case and composite explosives with comparable complex molecules were produced. It is therefore expected that all three silanes should give similar results.

The criteria for choosing the silane, other than the properties of the finished product, are a volatility sufficiently low to prevent the formation of bubbles in the composite during mixing and vacuum pouring at 165° F. and chemical compatibility with the energetic ingredient; this is checked by an Abel Heat type test to which is adapted a determination of the nature of the gases released at 100° C. for 72 hours. The reason for the low volatility is that the composites are generally produced by pouring under vacuum into a munition where curing takes place.

In view of the various embodiments described herein, it should be apparent to those skilled in the art that the present invention may be embodied in forms other than those specifically described without departing from the spirit or central characteristics of the invention. Thus, the specific embodiments described above must be considered in all respects as illustrative and not restrictive.

The embodiments of the invention in which an exclusive property or privilege is claimed are defined as follows:

1. A gravity pourable explosive composition, comprising a solid explosive ingredient selected from the group consisting of cyclotrimethylenetrinitramine (RDX) and cyclotetramethylenetetranitramine (HMX), a hydroxy-terminated polybutadiene based binder cured with a diisocyanate, and an organofunctional silane selected from the group consisting of gamma-methacryloxypropyltrimethoxy silane, beta-3,4-(epoxycyclohexyl)ethyltrimethoxy silane, gamma-glycidoxypropyltrimethoxy silane, trimethychlorosilane and N,O-bis-(trimethylsilyl)-acetamide.

2. An explosive composition according to claim 1, including a plasticizer.

3. An explosive composition according to claim 2, wherein the plasticizer is selected from the group consisting of diethylhexylazelate and dioctyladipate.

4. An explosive composition according to claim 3, wherein the amount of explosive solid in the composition is in the range of 70–85%/w.

5. An explosive composition according to claim 4, wherein the diisocyanate is selected from the group consisting of toluene diisocyanate, isophoronediisocyanate and a diisocyanate intermediate made from a 36-carbon dimer aliphatic dibasic acid.

6. An explosive composition according to claim 5, wherein the binder comprises an hydroxyl terminated polybutadiene selected from the group consisting of compounds of the structural formula:

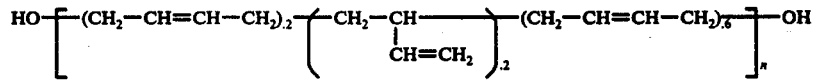

wherein n = 44–65 and the polybutadiene structure is 60% trans-1,4, 20% cis-1,4, and 20% vinyl-1,2.

7. An explosive composition according to claim 6, wherein the ratio of NCO/OH is about 0.85 to about 1.3.

8. An explosive composition according to claim 7, wherein the ratio of NCO/OH is about 1.15.

9. An explosive composition according to claim 1, additionally comprising an emulsifier selected from the group consisting of lecithin and asolectin.

* * * * *